US010146607B2

(12) United States Patent
Mukerji et al.

(10) Patent No.: US 10,146,607 B2
(45) Date of Patent: Dec. 4, 2018

(54) TROUBLESHOOTING OF CLOUD-BASED APPLICATION DELIVERY (71) Applicant: Anunta Technology Management Services Ltd., Mumbai (IN)

(72) Inventors: Ananda Mukerji, Mumbai (IN); Sanjiv Dalal, Mumbai (IN); Vinod Jeyachandran, Potomac, MD (US)

(73) Assignee: Anunta Technology Management Services Ltd., Mumbai (IN)

( * ) Notice: Subject to any disclaimer, the term of this patent is extended or adjusted under 35 U.S.C. 154(b) by 50 days.

(21) Appl. No.: 14/555,460

(22) Filed: Nov. 26, 2014

(65) Prior Publication Data

US 2015/0149828 A1 May 28, 2015

(30) Foreign Application Priority Data

Nov. 26, 2013 (IN) .......................... 3716/MUM/2013

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC ............. H04L 41/0677; H04L 41/0213; H04L 63/1416; G06F 11/0787; G06F 2201/81; H04J 2203/006; H04Q 3/0075
See application file for complete search history.

(56) References Cited

U.S. PATENT DOCUMENTS

| 5,937,154 | A  | * | 8/1999  | Tegethoff .............. G06F 11/261 712/227 |
| 6,874,111 | B1 | * | 3/2005  | Adams .................... G11C 29/16 714/733 |
| 7,113,988 | B2 | * | 9/2006  | Chirashnya ......... H04L 41/0681 709/203 |
| 7,287,190 | B2 | * | 10/2007 | Rosenman .......... G06F 11/2294 714/25 |
| 7,577,099 | B1 | * | 8/2009  | Greenberg .......... H04L 41/0677 370/241 |
| 7,900,201 | B1 |   | 3/2011  | Qureshi et al. |
| 8,194,926 | B1 | * | 6/2012  | Keysers ................ G06F 3/0487 382/103 |
| 8,276,020 | B2 | * | 9/2012  | Cates .................. G06F 11/3636 714/28 |
| 8,441,930 | B2 | * | 5/2013  | Li ........................ H04L 41/147 370/229 |
| 8,934,352 | B2 | * | 1/2015  | Pei ...................... H04L 41/0677 370/242 |
| 9,069,668 | B2 | * | 6/2015  | Tak ........................ G06F 11/079 |
| 9,235,982 | B2 | * | 1/2016  | Banerjee ................ G08B 29/20 |
| 9,298,525 | B2 | * | 3/2016  | Zhu ..................... G06F 11/0709 |

(Continued)

Primary Examiner — Loan L. T. Truong
(74) Attorney, Agent, or Firm — Law Office of Dorian Cartwright; Dorian Cartwright (57) ABSTRACT The techniques described herein provides troubleshooting, monitoring, reporting and dynamic adjustments and virtualization to management of application delivery. A system can be completely external to an application delivery data path, or can be highly compatible for integration to the application delivery path. Entities can be billed on a per user, per application, per usage, or any combination of consumption-based billing.

21 Claims, 7 Drawing Sheets

(56) References Cited

U.S. PATENT DOCUMENTS

| | | | |
|---|---|---|---|
| 9,317,269 B2* | 4/2016 | Kimmet | G06F 8/65 |
| 2002/0174207 A1* | 11/2002 | Battou | G06F 8/65 |
| | | | 709/223 |
| 2004/0243381 A1* | 12/2004 | Kuturianu | G06F 8/71 |
| | | | 703/22 |
| 2005/0021274 A1* | 1/2005 | Eden | G06F 11/3688 |
| | | | 702/121 |
| 2006/0259629 A1* | 11/2006 | Usmani | G06F 11/3688 |
| | | | 709/227 |
| 2007/0025355 A1* | 2/2007 | Cohen | H04L 41/145 |
| | | | 370/392 |
| 2008/0157775 A1* | 7/2008 | Finney | G01R 31/3277 |
| | | | 324/418 |
| 2008/0208958 A1 | 8/2008 | Huff et al. | |
| 2009/0048807 A1* | 2/2009 | Kikuchi | G06F 11/3409 |
| | | | 702/186 |
| 2009/0135727 A1* | 5/2009 | Agrawal | H04L 12/2602 |
| | | | 370/248 |
| 2009/0222575 A1* | 9/2009 | Goodman | H04L 43/50 |
| | | | 709/238 |
| 2009/0290488 A1* | 11/2009 | Honma | H04J 3/14 |
| | | | 370/228 |
| 2010/0284288 A1* | 11/2010 | Lee | H04L 63/1416 |
| | | | 370/252 |
| 2011/0085450 A1* | 4/2011 | Jeyachandran | H04L 41/12 |
| | | | 370/248 |
| 2011/0154119 A1* | 6/2011 | Wang | H04L 41/0631 |
| | | | 714/37 |
| 2011/0252071 A1 | 10/2011 | Cidon | |
| 2011/0271270 A1 | 11/2011 | Bowen | |
| 2012/0131385 A1* | 5/2012 | Chin | G06F 11/2284 |
| | | | 714/32 |
| 2012/0254269 A1 | 10/2012 | Carmichael | |
| 2012/0310584 A1* | 12/2012 | Oliveira | H04L 43/50 |
| | | | 702/119 |
| 2013/0007520 A1* | 1/2013 | Giammarresi | H04L 43/50 |
| | | | 714/32 |
| 2013/0018999 A1* | 1/2013 | Merrill | H04L 41/5041 |
| | | | 709/223 |
| 2013/0346947 A1* | 12/2013 | Braverman | G06F 11/368 |
| | | | 717/124 |
| 2014/0033241 A1* | 1/2014 | Valcourt | H04H 60/07 |
| | | | 725/14 |
| 2014/0122544 A1* | 5/2014 | Tran | G06F 21/10 |
| | | | 707/825 |
| 2014/0215058 A1* | 7/2014 | Vicat-Blanc | H04L 43/045 |
| | | | 709/224 |

* cited by examiner

TROUBLESHOOTING OF CLOUD-BASED APPLICATION DELIVERY

CROSS REFERENCE TO RELATED APPLICATION

This application claims the benefit of priority under 35 USC 119(e) to Patent Application No. 3716/MUM/2013 of the Patent Office of India, filed Nov. 26, 2013 and entitled MANAGEMENT OF CLOUD-BASED APPLICATION DELIVERY by Ananda Mukerji., et al., the contents of which are hereby incorporated in its entirety.

FIELD OF THE INVENTION

The invention relates generally to computer software and networking, and more specifically, to troubleshooting and managing the performance of applications that use cloud-based delivery infrastructures.

BACKGROUND

Remote applications are accessed by users of an end device through a network cloud. The application can be executed remotely, or be downloaded for local execution (e.g., using Java or Citrix). The penetration of virtualization and cloud technology in the application delivery space has resulted in huge changes required to manage application delivery to the end users.

Current troubleshooting for application delivery systems is limited. Issues are typically reported in raw form to an administrator for handling. The current management framework is based on a very device centric view of the application delivery infrastructure and often requires manual intervention to manage changes to the application delivery path.

Additionally, traditional application delivery systems seldom leverage real-time data from the environment executing the applications to manage performance parameters. Further, there is no conventional support for multi-tenancy.

Therefore, what is needed are robust management framework and tools for managing cloud-based delivery infrastructures that addresses the limitations. More specifically, the new framework to be defined should enable management of application centric parameters instead of managing device centric parameters.

SUMMARY

To meet the above-described needs, methods, computer program products, and systems for managing troubleshooting cloud-based delivery of applications, for example, with synthetic transactions. The techniques described herein provides monitoring, reporting, dynamic adjustments and virtualization to management of application delivery. In an embodiment, application centric controls can be adjusted to guarantee performance.

A system can be completely external to an application delivery data path, or can be highly compatible for integration to the application delivery path. Scripts executing on end devices generate synthetic transactions to test application performance as if a user was accessing applications. Real-time feedback from an environment in which applications are executing allow dynamic adjustments to guarantee performance. Entities can be billed on a per user, per endpoint device or any combination of consumption-based billing.

Advantageously, application performance is maintained by dynamic adjustments to an application delivery data path in real-time.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

To meet the above-described needs, methods, computer program products, and systems for managing cloud-based delivery of applications. In one embodiment, real-time feedback from end devices allows a centralized resource to dynamically adjust parameters of an application delivery data path. An integrated view of the application delivery path, in some embodiments is provided by an application library, a change module, a release module, a ticketing module, and the like, as discussed more fully herein.

Systems for Troubleshooting Cloud-Based Application Delivery

Figure 1:
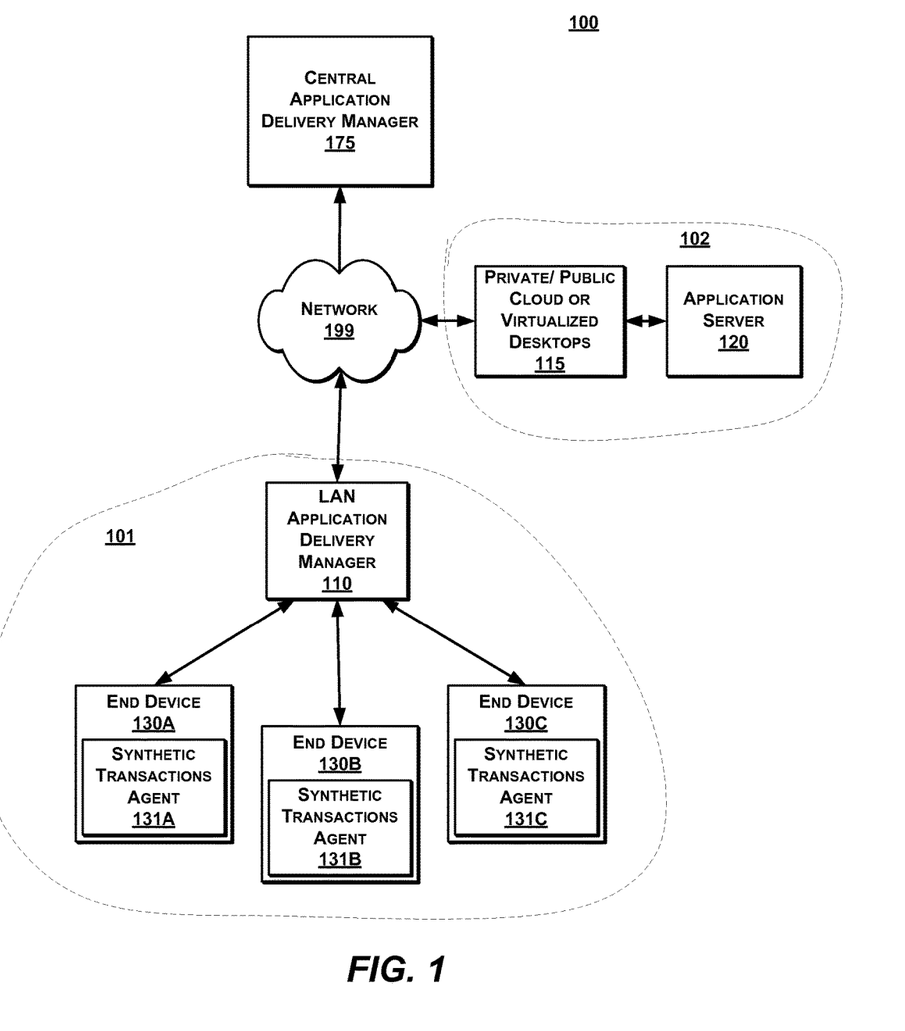
FIG. 1 is a high-level block diagram illustrating a system for managing cloud-based application delivery, according to one embodiment.

FIG. 1 is a high-level block diagram illustrating a system for managing cloud-based application delivery, according to one embodiment. The system 100 comprises a central application delivery manager 175, a private/public cloud or virtualized desktops (herein referred to as "cloud or desktops") 115, an application server 110, a LAN application delivery manager 120, and end devices 130A-C via the network 199. The connections can be wired, wireless, or a combination of both using mediums such as the Internet, 3G/4G cellular networks, analog telephone lines, power lines, or the like. Other embodiments are possible with additional component, such as routers, switches, firewalls, and access points.

A general data flow involves executing scripts of synthetic transactions from various locations on a private network 101 to test applications executing from a remotely-located data center 102 with reporting to the central application delivery manager 175. The data center 102 can be a public server farm operated by a vendor such as Amazon web services with scalable capacity, a software-as-a-service (SaaS) provider, or a private remote cloud for a particular entity. The central application delivery manager 175 can be operated by a separate entity than the data center 102 as a service, or by the same entity as the data center 102 for an integrated solution.

The central application delivery manager 175 manages aspects of troubleshooting application delivery from the application server 120 to the end devices 130A-C from the cloud (e.g., external to a LAN executing remote applications). A testing environment can involve running synthetic transactions from the end devices 130A-C to the application server 120 through the cloud or desktops 115. Responsive to trigger events or conditions received over the communication channels (e.g., brown outs, performance below targets, or a user reported problem), remedial action is taken automatically, or recommended to an administrator. In some implementations the central application delivery manager 175 is a virtualized group of servers. In other implementations different physical or logical servers are configured to handle web access, database record storage, event logs, and billing).

Figure 2:
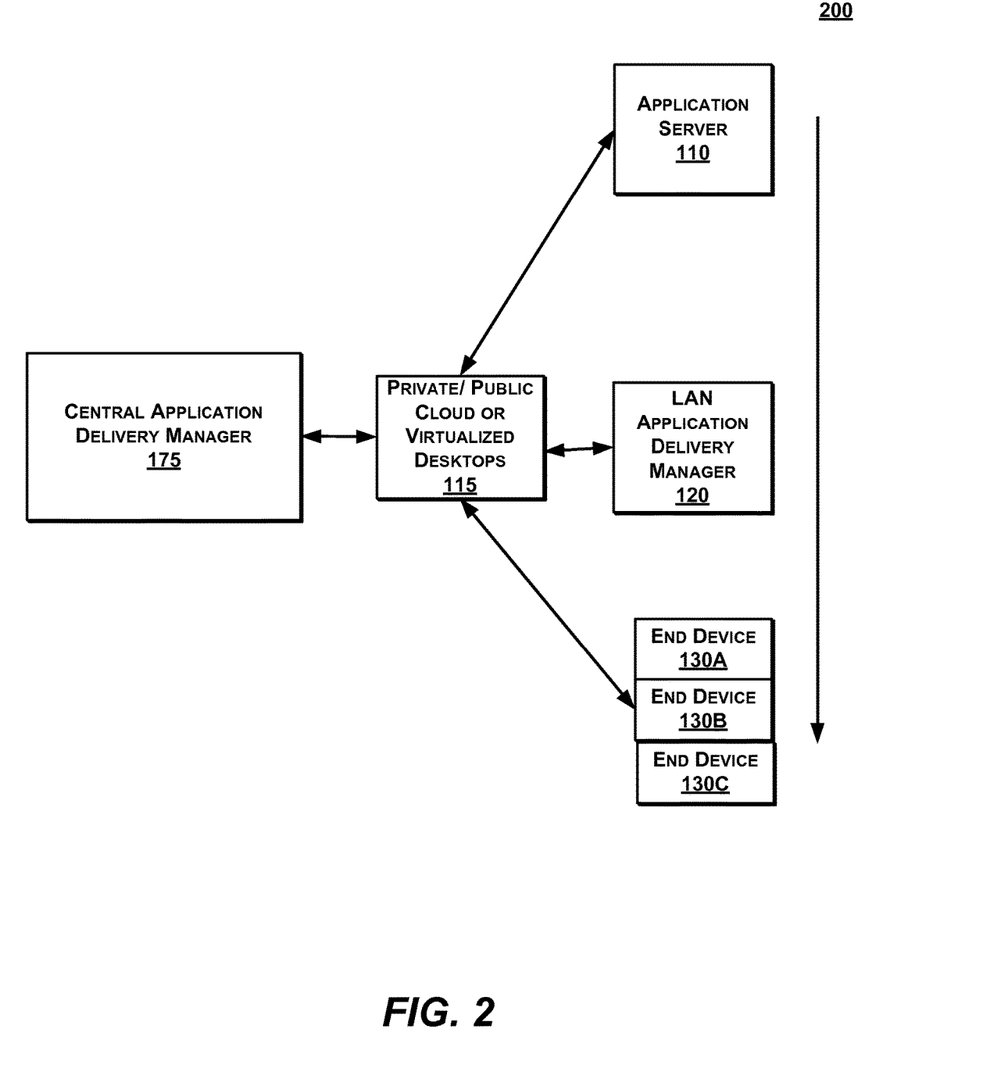
FIG. 2 is a high-level diagram illustrating an exemplary hierarchy of data flow in the system of FIG. 1, according to one embodiment.

Specific individual communication channels between the central application delivery manager 175 and other components of the system 100 are illustrated in FIG. 2. In some cases, an https connection is used for communication. The central application delivery manager 175, in some embodiments, configures the application server 110 and/or pvt/public cloud or virtualized desktops 115. An API interface can provide automated configurations and commands for adjustments in delivery parameters. The central application delivery manager 175 can subscribe to updates, and in some embodiments, sends synthetic transactions through the application server 110 for testing.

The central application delivery manager 175 receives data and metrics from the LAN application delivery manager 120. In some cases, the LAN application delivery manager 120 is part of the monitoring infrastructure and collects LAN data as the end devices 130A-C run scripts of synthetic transactions or remote applications. In some embodiments, applications are run from a network server that is monitored by the LAN application delivery manager 120, and parameters can be adjusted directly by the LAN application delivery manager 120. The end devices 130A-C exchange data and metrics with the central application delivery manager 175 via the LAN application delivery manager 120. The central application delivery manager 175 can provide services for numerous entities, thereby leveraging solutions for cross-entity problems. Billing to entities can be consumption-based, and granular on a per user, per application, per usage basis. Additional embodiments of the central application delivery manager 175 are set forth below with respect to FIG. 3.

Returning to FIG. 1, the application server 120 can be a host for remote applications that are provided on demand to the end devices 130A-C. In one example, the end devices 130A-C send data to the application server 120 for processing and results are returned (e.g., a search query returns a search results page). In another example, the end devices 130A-C download or stream software code as needed over the network 199 to execute functions of one or more applications. In some embodiments, the application server 120 lacks automated, native feedback mechanisms for the end devices 130A-C to improve performance.

The LAN application delivery manager 120 can be integrated into the LAN of entity, business, office location, home, or hybrid LAN environment (e.g., VLANs). Local services are performed for load balancing, and some issues are elevated to the central application delivery manager 175. In an embodiment, applications are hosted in LAN application server (not shown) that is in communication with the LAN application delivery manager 120. In another embodiment, the LAN application delivery manager 120 adjusts network parameters responsive to application performance on the end devices 130A-C.

On the cloud or desktops 115, a hypervisor can provide virtualized desktop services with individual virtual machines, for example, for each session (e.g., Citrix or VM Ware hypervisors). Multi-tenancy for customization and separated data is supported for several end devices 130A-C accessing the same application instance, in an embodiment.

The end devices 130A-C execute remote applications in a live environment further comprise synthetic transactions agents 131A-C to execute scripts of synthetic transactions in a testing environment. A web browser or locally installed application can provide an application layer interface to resources of the application server 110. In some implementations, an end device communicates with several application servers. A daemon, background process, plug-in, or the like, runs the scripts and, in an embodiment, provides an interface to the central application delivery manager 175. Information regarding application performance is collected through, for example, user interactions (e.g., mouse or keyboard input), alerts received from the user, monitoring of hardware (e.g., processor or memory usage), and network metrics (e.g., bandwidth usage). An operating system of the end device 130A-C can be interrogated for statuses, and the interrogations can be tracked to identify trends.

Generally, the computer components of the system 100 can be a personal computer, a server, one or many devices, stationary or mobile, as discussed in more detail below with respect to FIG. 7.

Figure 3:
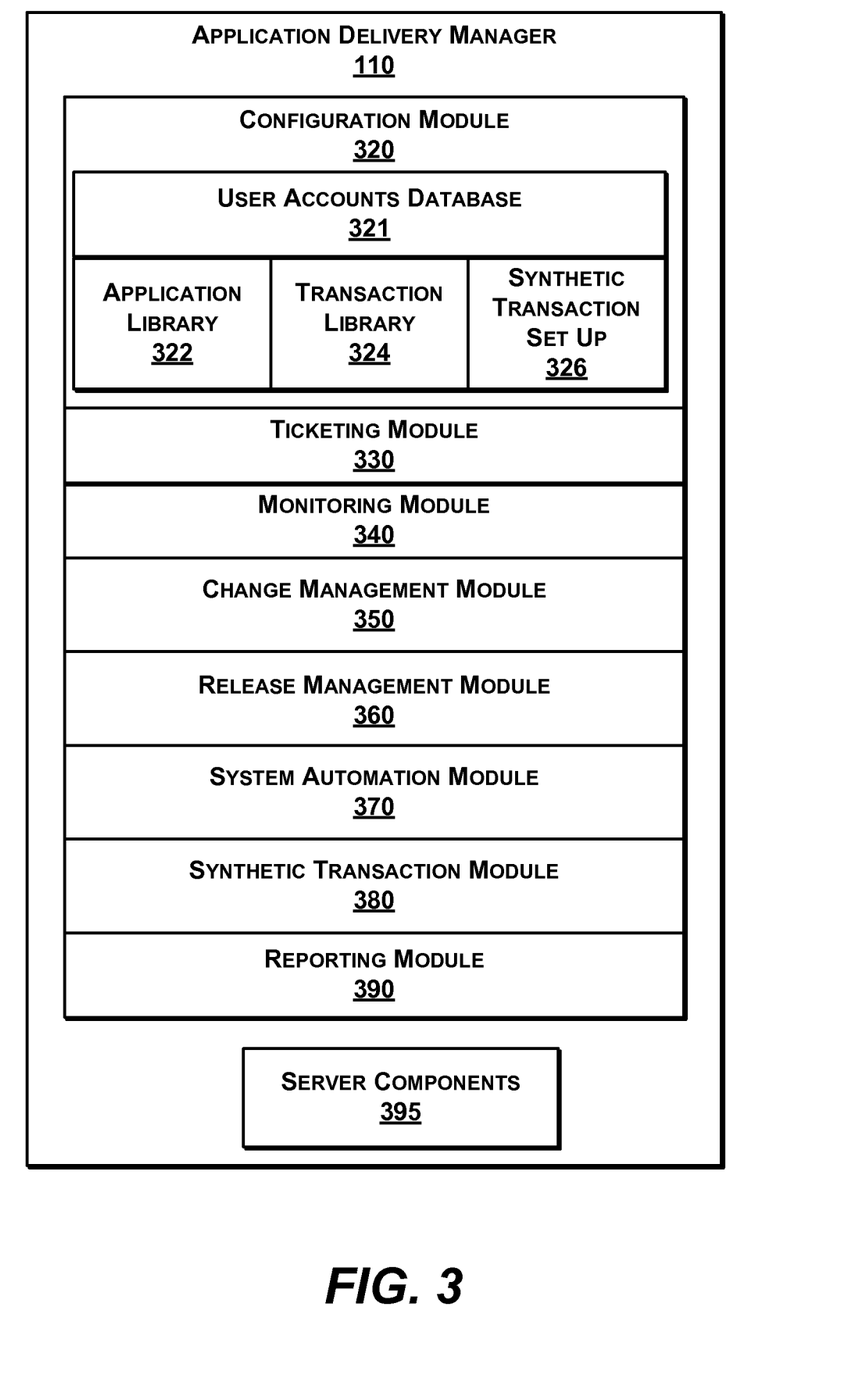
FIG. 3 is a more detailed block diagram illustrating an application delivery manager of the system of FIG. 1, according to one embodiment.

FIG. 3 is a more detailed block diagram illustrating a central application delivery manager 175 of the system of FIG. 1, according to one embodiment. The central application delivery manager 110 includes various, implementation-specific modules (executing, for example) in a memory or through customized hardware) and server components 395. The server components 395 can include conventional aspects such as memory, a processor, power supplies, transceivers, antennae, and the like.

A configuration module 320 sets up a new customer account and changes existing ones in use accounts database 321. Information about an application delivery data path can be collected, such as specifics about hardware, network details, applications to be delivered, critical transactions and required response times, authorizations, and billing details. A footprint is also determined with respect to types of end points in a testing environment, IP addresses, and connection durations, for example. An application library 322 stores applications used by an entity. A transaction library 324 stores critical transactions and required performance against each application. A synthetic transaction set up 326 configures a simulation of actual transactions and is used to measure application performance. In some embodiments, synthetic transactions can be customized to a specific customer application configuration and/or application data path. The synthetic transactions are drawn from to create one or more scripts run from the end devices 130A-C for testing.

Application delivery path can also be auto-discovered. In a cloud-based application delivery environment, the application delivery path generally comprises of the end-user system, the wide area network, the data center network, the virtualization layer and application servers. Application delivery management is much more effective when the delivery path is auto-discovered and automatically kept up-to-date.

A ticketing module 330 includes commercial management functionality such as interaction vectors, resource planning, workflow assignment, and known error databases (KEDBs). Tickets can be primarily application symptom based rather than device symptom based. For example, HTTP 404: Page not found error, Higher than usual application response times. Logging can be integrated with the workflow of a structured incident management flow. Assists are knowledge based for faster resolution.

A monitoring module 340 receives signals concerning application performance and the application data path, such as SNMP (Simple Network Management Protocol)/SYSLOG signals, from different devices. The signals can be analyzed against preconfigured device level thresholds. Alerts and/or corrective actions can be generated, for example, in terms of capacity changes and allocation changes that are automatically implemented. In one embodiment, automated capacity changes up to predetermined thresholds are performed and, thereafter, capacity requisitioning is automatically initiated. Algorithms can be based on short term predictions on capacity utilization.

A change management module 350 receives and processes change requests from users through a workflow system that includes authorization and ends by scheduling a change to be executed through IT infrastructure on the application delivery path. In some embodiments, change impact analysis is performed whereby device level requirements are captured in the workflow to allow automatic routing to device specialists and minimizing errors. A parameterized script generator tool can generate commands for supported devices. A change scheduler applies changes to devices automatically at scheduled times with no manual intervention. A device library stores standard devices with standard scripts written for specific transactions in parameterized format. New scripts can be automatically added after release.

A release management module 360 provides fully integrated and automated release management across devices. Device and user abstraction techniques can be implemented. Backups can be stored on a backup restore manager.

A system automation module 370 enables end users to automatically provision and decommission assets and allocate resources (e.g., CPU, memory, storage) without any intervention. The system automation module 370 can be implemented in a private cloud or in a LAN. A vendor gateway can enable connectivity with equipment vendors and be used to automate the external ticketing and provisioning.

A synthetic transaction module 380 creates and stores synthetic transactions and executes them at preconfigured durations to measure application performance and system health. Integration with the Infrastructure Management Services (IMS) platform and establishment of device thresholds is possible. As a result, scripts of synthetic transactions operating at the end users 130A-C can report to the synthetic transaction module 380 for feedback.

A reporting module 390 generates customized reports for an entity or specific users. Reports can include performance and usage of specific applications. Billing can be automated and billing plans can be customized on a per user, per application or per usage basis, as discussed above.

Methods for Troubleshooting Cloud-Based Application Delivery

Figure 4:
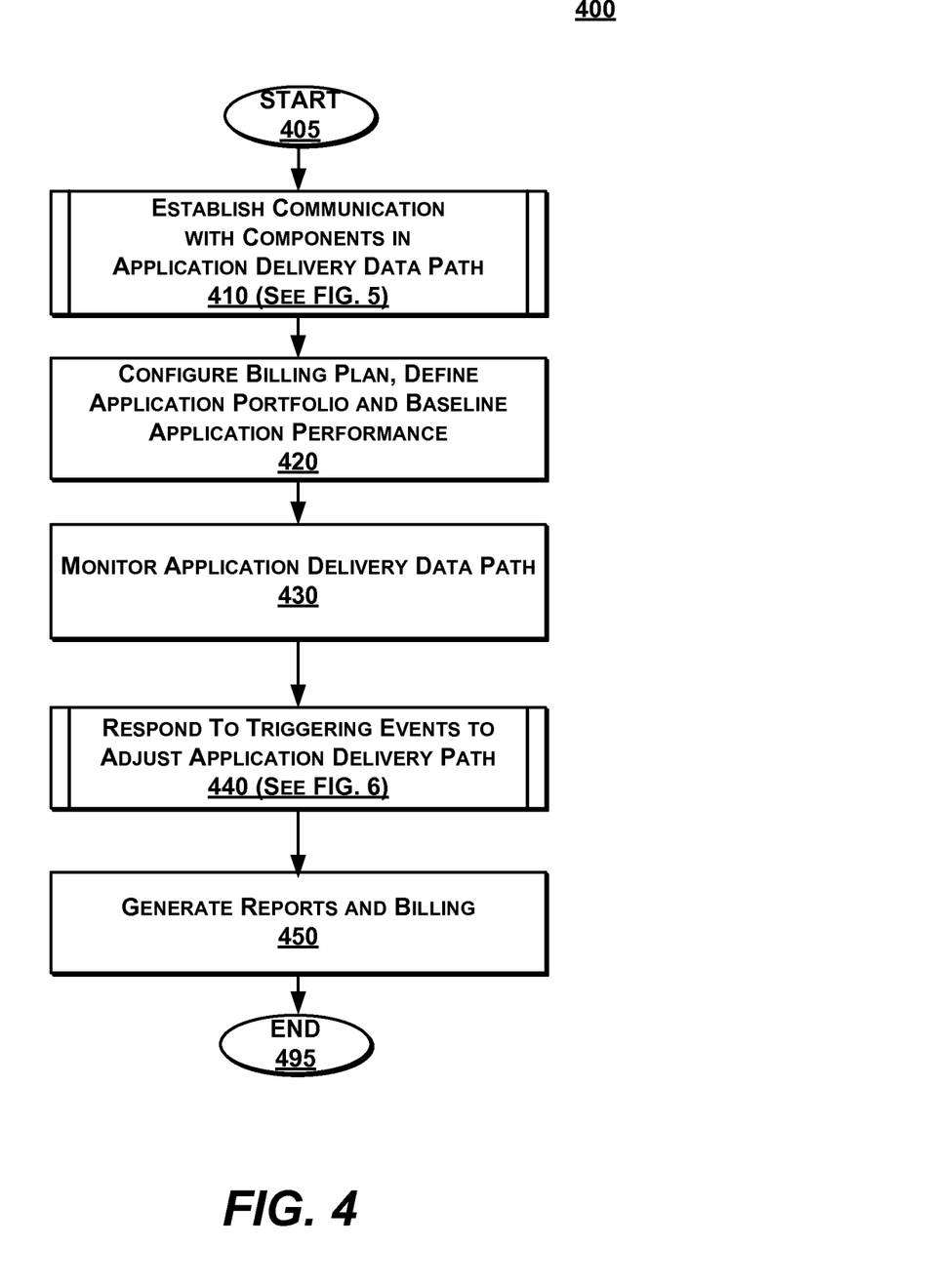
FIG. 4 is a high-level flow diagram illustrating a method for managing cloud-based application delivery, according to one embodiment.

FIG. 4 is a high-level flow diagram illustrating a method 400 for managing cloud-based application delivery, according to one embodiment. The method 400 can be implemented in the system 100 (e.g., by the central application delivery manager 175), as described above. At step 410 communication is established with components in an application delivery data path. At step 420, examples of system configuration are given, for example, a billing plan is configured, an application portfolio is defined and application performance is baselined. At step 430, the application delivery data path is monitored. At step 440, triggering events are responded to in order to adjust the application delivery path. Examples of triggering events include brown outs, performance below at least one threshold, network connectivity problems, low network bandwidth, high usage of a hardware resource or device, and the like. In one embodiment, a synthetic transaction is a triggering event as described below in association with FIG. 5. At step 450, reports and billing is generated.

Figure 5:
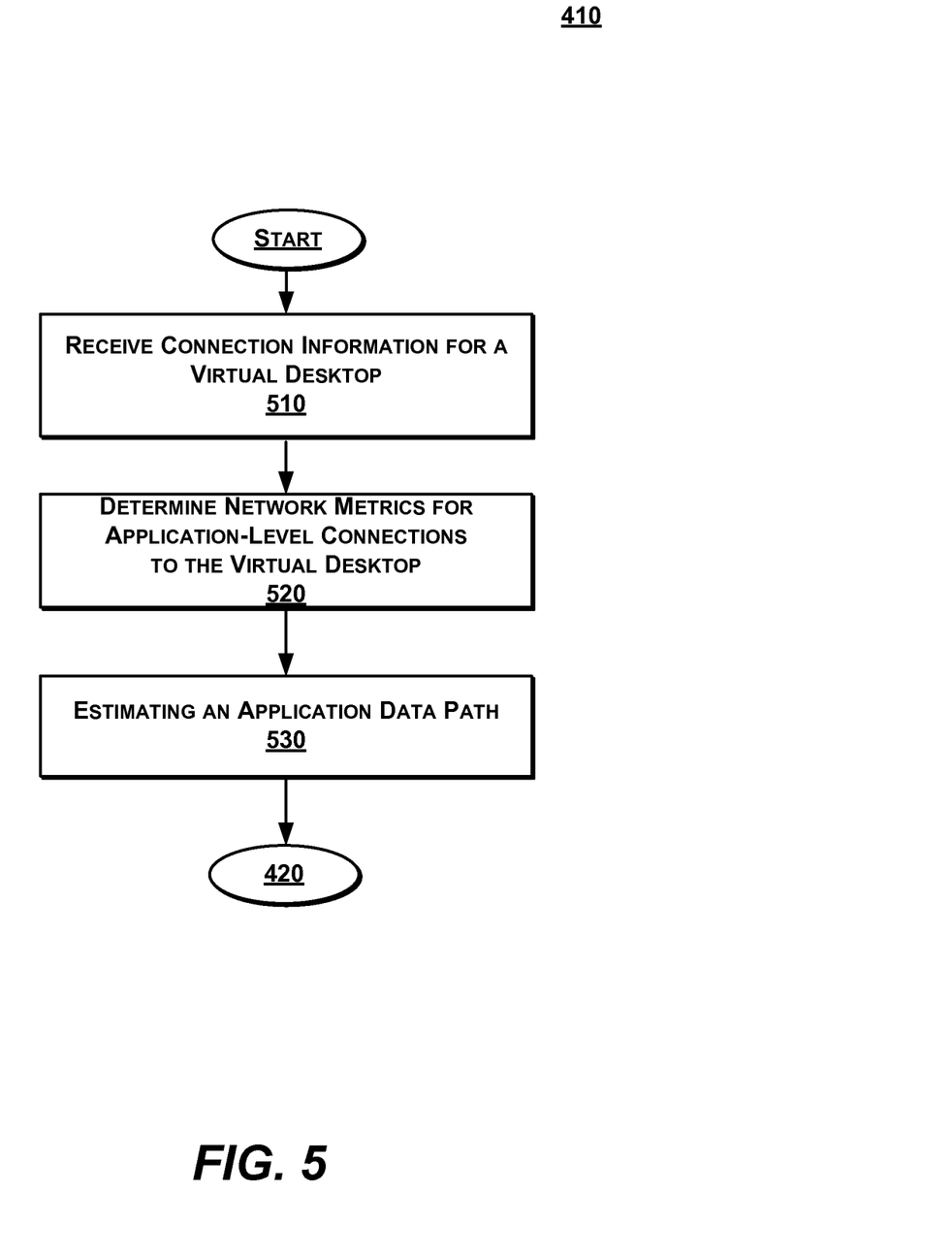
FIG. 5 is a more detailed flow diagram illustrating a step of establishing communication with components in the data path of the method of FIG. 4, according to one embodiment.

FIG. 5 is a more detailed flow diagram illustrating the step 410 of establishing communication with components in the data path of the method of FIG. 4, according to one embodiment. At step 510, connection information for a virtual desktop is received. At step 520, network metrics for application-level connections to the virtual desktop are determined. At step 530, an application data path is estimated.

Figure 6:
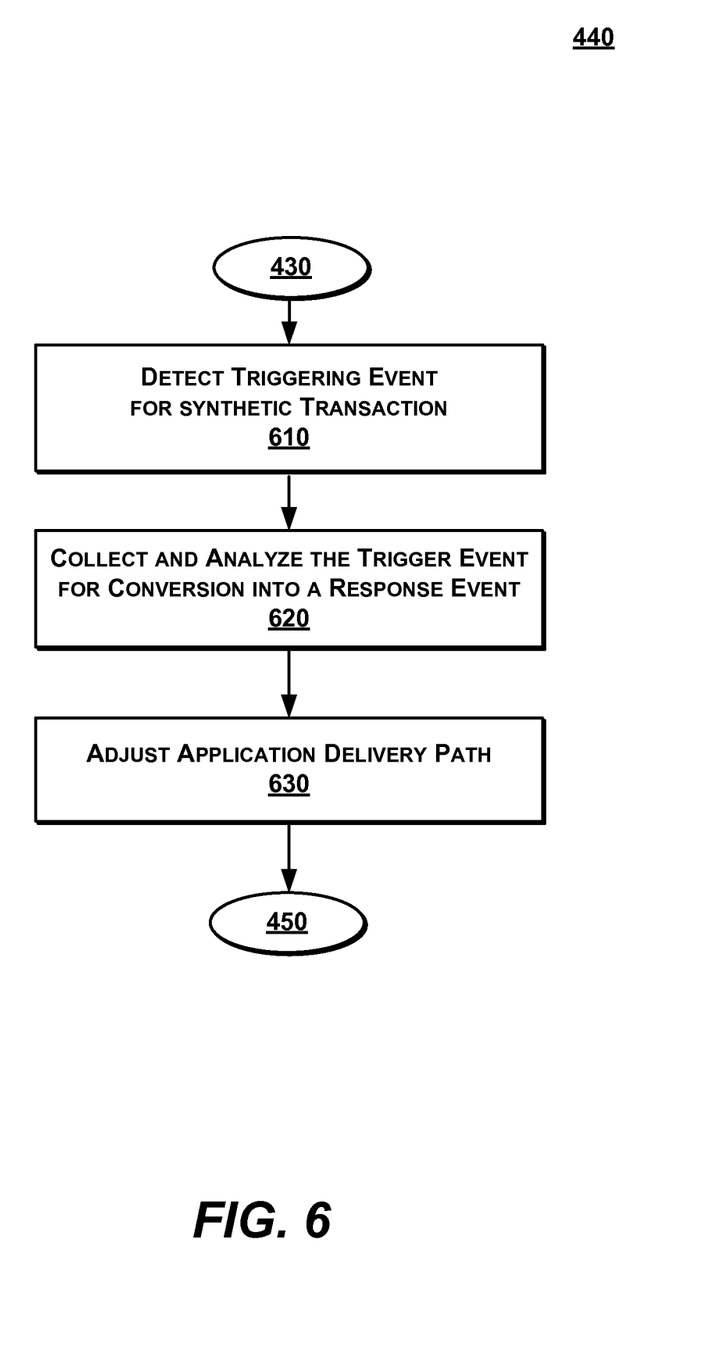
FIG. 6 is a more detailed flow diagram illustrating a step of responding to triggering events to an application delivery path of the method of FIG. 4, according to one embodiment.

FIG. 6 is a more detailed flow diagram illustrating the step 440 of responding to triggering events to adjust the application delivery data path. At step 610, a triggering event for a synthetic transaction is detected. At step 620, results of the trigger event are collected and analyzed for conversion into a response event. At step 630, the application delivery path is adjusted.

III. General Computing Devices

Figure 7:
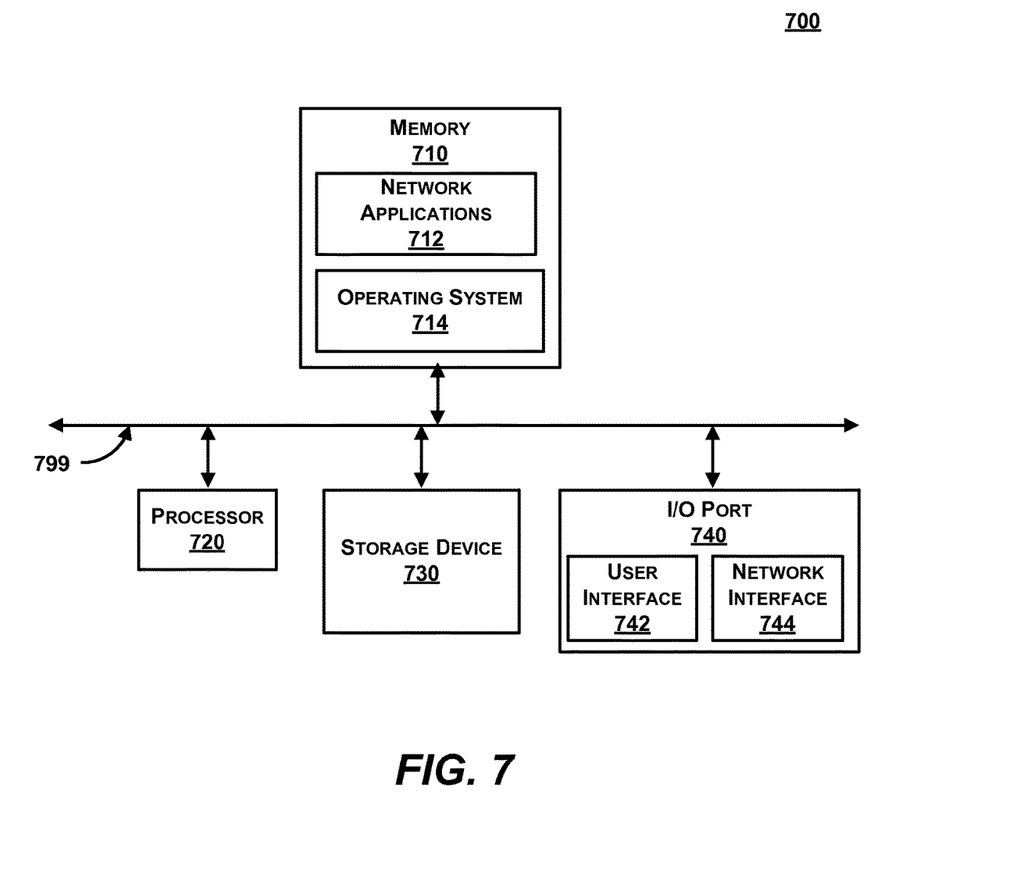
FIG. 7 is a more detailed block diagram of an exemplary computing device used in the system, according to one embodiment.

Many of the functionalities described herein can be implemented with computer software, computer hardware, or a combination, as shown in FIG. 7.

The computing device 700 is an exemplary device that is implementable for each of the components of the system 100, including the wireless networking device 130. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 7, 8, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11 ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an application delivery manager communicatively coupled to both one or more end user devices and an application server over a data communication network, for per-device troubleshooting of remote end-user experience of an application over cloud-based application delivery, the method comprising the steps of:

configuring baseline application performance for an application-level connection between an application from the application server and each of the one or more end user devices, wherein the application server provides remote applications on demand separately to the one or more end user devices;

receiving application-level connection information for each virtual desktop to the one or more end user devices, executing on a virtual machine, for access to applications on the application server for the one or more end user devices;

initiating remote execution of a simulation test script, located within and executed within each of the one or more devices, to send synthetic transactions from the one or more end user device to the virtual desktop;

determining application performance for applications across the virtual desktop from the synthetic transactions of the test script;

estimating an application delivery path for the application-level connections across the virtual desktop, the application delivery path comprising network connections from the virtual desktop of the application server to the one or more end user devices and network connections from the virtual desktop to the application server, over the data communication network;

receiving an alert, at the application delivery manager, based on application performance of the simulation test script located within and executing within the one or more end user devices with an application-layer connection of the application delivery path, the alert based on real-time signal information for application performance at the one or more end user devices violating the baseline application performance, wherein application performance fluctuates at least partially independent of network performance based on triggering events due to high usage of hardware resource or at least one of end user devices; and in accordance with a determination that real-time signal information is violated, automatically adjusting the application delivery path to improve application performance.

2. The method of claim 1, wherein receiving alerts based on the user simulation test script executing on the end device, comprises:

sending synthetic transactions, from an agent executing on the one or more user end devices, to the virtual desktop.

3. The method of claim 1, wherein the application performance is based at least in part on one or more of: user interactions, monitoring of hardware, type of end points, IP addresses of end points, and connection durations with end points.

4. The method of claim 1, wherein estimating the application delivery path comprises:

inferring data plane characteristics and components of the application delivery path from application layer characteristics created by the end user.

5. A non-transitory computer-readable medium storing instructions that, when executed by a processor, perform a computer implemented method, in an application delivery manager, communicatively coupled to both one or more end user devices and an application server over a data communication network, for per-device troubleshooting of remote end-user experience of an application over cloud-based application delivery, the method comprising the steps of:
configuring baseline application performance for an application-level connection between an application from the application server and each of the one or more end user devices, wherein the application server provides remote applications on demand separately to the one or more end user devices;
receiving application-level connection information for each virtual desktop to the one or more end user devices, executing on a virtual machine, for access to applications on the application server for the one or more end user devices;
initiating remote execution of a simulation test script, located within and executed within each of the one or more devices, to send synthetic transactions from the one or more end user device to the virtual desktop;
determining application performance for applications across the virtual desktop from the synthetic transactions of the test script;
estimating an application delivery path for the application-level connections across the virtual desktop, the application delivery path comprising network connections from the virtual desktop of the application server to the one or more end user devices and network connections from the virtual desktop to the application server, over the data communication network;
receiving an alert, at the application delivery manager, based on application performance of the simulation test script located within and executing within the one or more end user devices with an application-layer connection of the application delivery path, the alert based on real-time signal information for application performance at the one or more end user devices violating the baseline application performance, wherein application performance fluctuates at least partially independent of network performance based on triggering events due to high usage of hardware resource or at least one of end user devices; and
in accordance with a determination that real-time signal information is violated, automatically adjusting the application delivery path to improve application performance.

6. The non-transitory computer-readable medium of claim 5, wherein receiving alerts based on the user simulation test script executing on the end device, comprises:
sending synthetic transaction, from an agent executing ton the one or more user end devices, to the virtual desktop.

7. The non-transitory computer-readable medium of claim 5, wherein the application performance is based at least in part on one or more of: user interactions, monitoring of hardware, type of end points, IP addresses of end points, and connection durations with end points.

8. The non-transitory computer-readable medium of claim 5, wherein estimating the application delivery path comprises:

inferring data plane characteristics and components of the application delivery path from application layer characteristics created by the end user.

9. A central application delivery manager communicatively coupled to both one or more end user devices and an application server over a data communication network, to per-device troubleshoot remote end-user experience of an application over cloud-based application delivery, the central application delivery manager comprising:
a processor; and
a memory, comprising:
a first module to configure baseline application performance for an application-level connection between an application from the application server and each of the one or more end user devices, wherein the application server provides remote applications on demand separately to the one or more end user devices, the first module to receive application-level connection information for each virtual desktop to the one or more end user devices, executing on a virtual machine, for access to applications on the application server for the one or more end user devices;
a second module initiate remote execution of a simulation test script, located within and executed within each of the one or more devices, to send synthetic transactions from the one or more end user device to the virtual desktop, the second module to determine application performance for applications across the virtual desktop from the synthetic transactions of the test script;
a third module to estimate an application delivery path for the application-level connections across the virtual desktop, the application delivery path comprising network connections from the virtual desktop of the application server to the one or more end user devices and network connections from the virtual desktop to the application server, over the data communication network;
a fourth module to receive an alert, at the application delivery manager, based on application performance of the simulation test script located within and executing within the one or more end user devices with an application-layer connection of the application delivery path, the alert based on real-time signal information for application performance at the one or more end user devices violating the baseline application performance, wherein application performance fluctuates at least partially independent of network performance based on triggering events due to high usage of hardware resource or at least one of end user devices; and
a sixth module to automatically adjust the application data path in accordance with a determination that real-time signal information is violated, automatically adjusting the application delivery path to improve application performance.

10. The method of claim 1, wherein the reconfiguring the cloud-based application delivery is implemented by an API interface.

11. The non-transitory computer-readable medium of claim 5, wherein the reconfiguring the cloud-based application delivery is implemented by an API interface.

12. The method of claim 1, wherein the connection information for a virtual desktop further comprises one or more virtual desktop infrastructure elements.

13. The non-transitory computer-readable medium of claim 5, wherein the connection information for a virtual desktop further comprises one or more virtual desktop infrastructure elements.

14. The method of claim 1, wherein the application delivery path further comprises one or more virtual desktop infrastructure elements.

15. The non-transitory computer-readable medium of claim 5, wherein the application delivery path further comprises one or more virtual desktop infrastructure elements.

16. The method of claim 1, wherein the simulation test script executes a set of synthetic transactions at preconfigured times.

17. The method of claim 1, wherein the simulation test script comprises a set of synthetic transactions, at least one of the transactions customized to a specific application.

18. The method of claim 1, wherein the simulation test script comprises a set of synthetic transactions, at least one of the transactions customized to a specific application delivery path.

19. The method of claim 1, wherein the application delivery manager comprises a LAN application delivery manager located on a LAN in common with the one or more end user devices.

20. The method of claim 1, wherein the application delivery manager comprises a central application delivery manager located remotely from a LAN including the one or more end user devices.

21. The method of claim 20, wherein the central application delivery manager services a plurality of differing entities located on a plurality of different LANs.

\* \* \* \* \*